(12) United States Patent
Ura

(10) Patent No.: US 11,823,047 B2
(45) Date of Patent: Nov. 21, 2023

(54) ESTIMATION DEVICE OF AMOUNT OF OIL COKE DEPOSITS IN TURBOCHARGER

(71) Applicant: TOYOTA JIDOSHA KABUSHIKI KAISHA, Toyota (JP)

(72) Inventor: Haruto Ura, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 115 days.

(21) Appl. No.: 17/548,766

(22) Filed: Dec. 13, 2021

(65) Prior Publication Data

US 2022/0195915 A1    Jun. 23, 2022

(30) Foreign Application Priority Data

Dec. 18, 2020 (JP) .................. 2020-210599

(51) Int. Cl.
*G06N 3/08* (2023.01)
*F02B 37/00* (2006.01)
*F02B 39/16* (2006.01)

(52) U.S. Cl.
CPC ..................... *G06N 3/08* (2013.01)

(58) Field of Classification Search
CPC .......... G06N 3/08; G06N 3/084; G06N 20/00; G06N 3/02; G06N 3/044; G06N 3/045; G06N 3/088; G06N 3/126; G06N 3/086; F02B 37/00; F02B 39/14; G05B 23/0283; G05B 23/024; G05B 23/0221; G05B 23/0229; F02D 41/029; F02D 41/1405; F02D 2200/0802; F02D 2041/1433; F02D 41/0007

USPC ........ 60/605.2; 700/28–30, 108, 110; 701/1, 701/29.1, 29.4–29.5, 31.4, 33.4, 99–101, 701/103, 106, 108; 702/1, 33–34, 60, 81,
(Continued)

(56) References Cited

U.S. PATENT DOCUMENTS 6,092,017 A * 7/2000 Ishida ................. F02D 41/1404
706/2
6,122,589 A * 9/2000 Yamaguchi ........... F02D 41/047
123/480

(Continued)

FOREIGN PATENT DOCUMENTS

CN    110261127 A  *  9/2019
JP    2009-270524 A    11/2009

OTHER PUBLICATIONS

Miyata et al., "Mechanism of Turbocharger Coking in Gasoline Engines," SAE Technical Paper 2015-01-2029, 2015.

*Primary Examiner* — Jeffrey P Aiello
(74) *Attorney, Agent, or Firm* — Oliff PLC

(57) ABSTRACT

A memory of an electronic control unit stores a neural network into which travel state quantities of a vehicle are input and from which an internal temperature of a turbocharger is output. An arithmetic processing circuit of the electronic control unit executes an internal temperature estimation process of calculating, as an estimated value of the internal temperature, an output of the neural network using measured values of the travel state quantities as an input, and a deposit amount estimation process of calculating an amount of increase in an amount of oil coke deposits based on the estimated value of the internal temperature and calculating an estimated value of the amount of oil coke deposits as a value integrating the amount of increase.

5 Claims, 6 Drawing Sheets

(58) Field of Classification Search
USPC .............. 702/84–85, 99, 127–130, 176–179,
702/181–189, 193; 703/2, 8
See application file for complete search history.

(56) References Cited

U.S. PATENT DOCUMENTS

| | | | |
|---|---|---|---|
| 2019/0277207 A1* | 9/2019 | Matoba | F02B 33/38 |
| 2019/0325671 A1* | 10/2019 | Takasu | F02D 41/1405 |
| 2020/0263581 A1* | 8/2020 | Muto | F01N 3/18 |
| 2021/0326677 A1* | 10/2021 | Kamiguchi | G06F 11/3055 |

* cited by examiner

ESTIMATION DEVICE OF AMOUNT OF OIL COKE DEPOSITS IN TURBOCHARGER

CROSS-REFERENCE TO RELATED APPLICATION

This application claims priority to Japanese Patent Application No. 2020-210599 filed on Dec. 18, 2020, incorporated herein by reference in its entirety.

BACKGROUND

1. Technical Field

The present disclosure relates to an estimation device of an amount of oil coke deposits in a turbocharger.

2. Description of Related Art

Japanese Unexamined Patent Application Publication No. 2009-270524 mentions that oil contained in blowby gas flowing into a compressor of a turbocharger along with intake air cokes by undergoing a temperature rise due to compression of the intake air in the compressor and adheres to the inside of the compressor.

SUMMARY

Oil used for purposes including lubricating a journal is present inside a turbocharger. When the inside of the turbocharger is heated to a high temperature by exhaust gas during operation of the engine, also this oil inside the turbocharger cokes and deposits on a wall surface of an oil passage, a journal part, etc. When deposition of coked oil, i.e., so-called oil coke progresses, the flow of the oil and the rotation of a turbine shaft may be hindered.

Currently, the only way to check the status of oil coke deposition inside a turbocharger is to disassemble the turbocharger. However, most vehicles are operated without assuming regular disassembly and maintenance of the turbocharger. In these cases, the turbocharger needs to be designed such that the amount of oil coke deposits remains within such a range as not to lead to a problem throughout the lifetime of the vehicle. Such design would be based on the assumption of common operating conditions and operating periods of vehicles. Meanwhile, recently, even vehicles developed as private cars may be used in various forms, including car sharing. In such cases, the operating conditions and operating periods vary greatly among vehicles. This makes it difficult to define the common operating conditions and operating periods and therefore to design a turbocharger as described above.

An estimation device of an amount of coke deposits in a turbocharger that solves the above problem is a device that estimates an amount of oil coke deposited inside a turbocharger installed in a vehicle and includes an execution device and a storage device. The storage device stores a neural network into which travel state quantities indicating a travel state of the vehicle are input and from which an internal temperature of the turbocharger is output. This neural network is learned using, as teacher data, a measured value of the internal temperature and measured values of the travel state quantities measured at the time of measurement of the internal temperature. The execution device executes an internal temperature estimation process of calculating, as an estimated value of the internal temperature, an output of the neural network using the measured values of the travel state quantities as an input, and a deposit amount estimation process of calculating an amount of increase in the amount of deposits based on the estimated value of the internal temperature and calculating an estimated value of the amount of deposits as a value integrating the amount of increase.

The amount of oil coke newly generated and deposited inside a turbocharger depends on the internal temperature of the turbocharger. The internal temperature of the turbocharger changes with the travel state of the vehicle. There are a large number of travel state quantities that influence the internal temperature of the turbocharger, and the relationship between each travel state quantity and the internal temperature is complicated.

In view of this, the neural network stored in the storage device of the above-described estimation device has learned the relationships between the travel state quantities and the internal temperature in advance. By using such a neural network, the internal temperature of the turbocharger can be estimated from the travel state quantities of the vehicle. Then, the amount of increase in the amount of oil coke deposits can be obtained from the estimated internal temperature, and further the amount of deposits can be obtained as a value integrating this amount of increase. Thus, this estimation device can precisely estimate the amount of oil coke deposited inside the turbocharger.

The execution device of the above-described estimation device may be configured to, when the estimated value of the amount of deposits exceeds a predetermined threshold value, execute a commanding process of commanding that an engine output be restricted. Restricting the engine output can mitigate the rise in the internal temperature of the turbocharger and thereby the subsequent deposition of oil coke. Thus, the likelihood of excessive deposition of oil coke beyond an allowable range can be reduced.

The execution device of the above-described estimation device may be configured to, when the estimated value of the amount of deposits exceeds a predetermined threshold value, execute a commanding process of commanding that a user of the vehicle be notified that the turbocharger is in a state requiring maintenance. In this case, a notification recommending maintenance to the user is given at the time when deposition of oil coke has reached a certain amount. Thus, maintenance can be recommended at an appropriate time before the deposition of oil coke exceeds the allowable range.

It takes some time before changes in the travel state quantities are reflected on the internal temperature. Therefore, it is desirable to use time-series data of the travel state quantities as the input for the neural network.

Major travel state quantities of a vehicle that influence the internal temperature of the turbocharger include a vehicle speed, an engine speed, an accelerator pedal operation amount, a fuel injection amount, a supercharging pressure, an intake air flow rate, an outside air temperature, and an intake air temperature. Therefore, it is desirable to include one or more of these quantities in the travel state quantities used as the input for the neural network.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

One embodiment of an estimation device of an amount of oil coke deposits in a turbocharger will be described below in detail with reference to FIG. 1 to FIG. 6.

Configuration of Turbocharger

Figure 1:
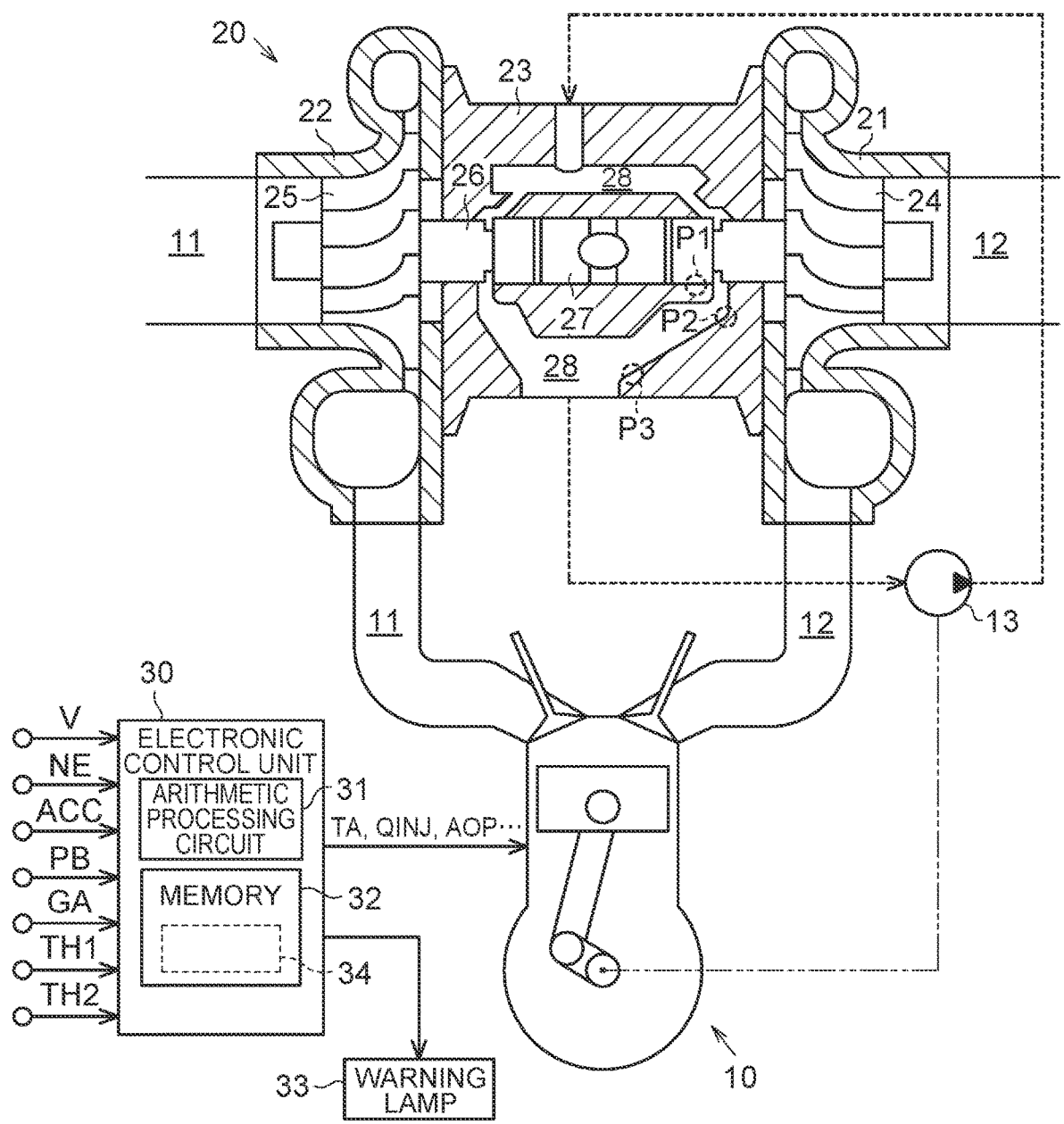
FIG. 1 is a diagram schematically showing the configuration of one embodiment of an estimation device of an amount of oil coke deposits in a turbocharger.

First, the configuration of a turbocharger 20 for which the estimation device of the embodiment estimates an amount of oil coke deposits will be described with reference to FIG. 1. As shown in FIG. 1, the turbocharger 20 is installed in an engine 10. The engine 10 is installed in a vehicle. The engine 10 is provided with an intake passage 11 and an exhaust passage 12. Further, an oil pump 13 that operates in response to rotation of the engine 10 is installed in the engine 10.

The turbocharger 20 includes a turbine housing 21 installed in the exhaust passage 12 of the engine 10 and a compressor housing 22 installed in the intake passage 11 of the engine 10. The turbine housing 21 and the compressor housing 22 are coupled to each other through a journal housing 23. Inside the turbine housing 21, a turbine wheel 24 that rotates as exhaust gas flowing through the exhaust passage 12 blows thereon is installed. Inside the compressor housing 22, a compressor wheel 25 that compresses intake air flowing through the intake passage 11 as it rotates is installed. A turbine shaft 26 that couples the turbine wheel 24 and the compressor wheel 25 to each other is passed through the journal housing 23. The turbine shaft 26 is rotatably supported on the journal housing 23 by a floating bearing 27. Inside the journal housing 23, an oil passage 28 that is a passage for oil to flow through the floating bearing 27 is formed. Part of oil discharged by the oil pump 13 is supplied to the oil passage 28.

Configuration of Estimation Device

Next, the configuration of the estimation device of the embodiment will be described. The vehicle provided with the turbocharger 20 is equipped with an electronic control unit 30 for controlling the engine. The electronic control unit 30 includes an arithmetic processing circuit 31 that executes various processes for engine control and a memory 32 that stores programs and data for engine control. Detection signals of state quantities indicating a travel state of the vehicle, including a vehicle speed V, an engine speed NE, an accelerator pedal operation amount ACC, a supercharging pressure PB, an intake air flow rate GA, an outside air temperature TH1, and an intake air temperature TH2, are input into the electronic control unit 30. In the configuration of this embodiment, the electronic control unit 30 corresponds to the estimation device.

Figure 2:
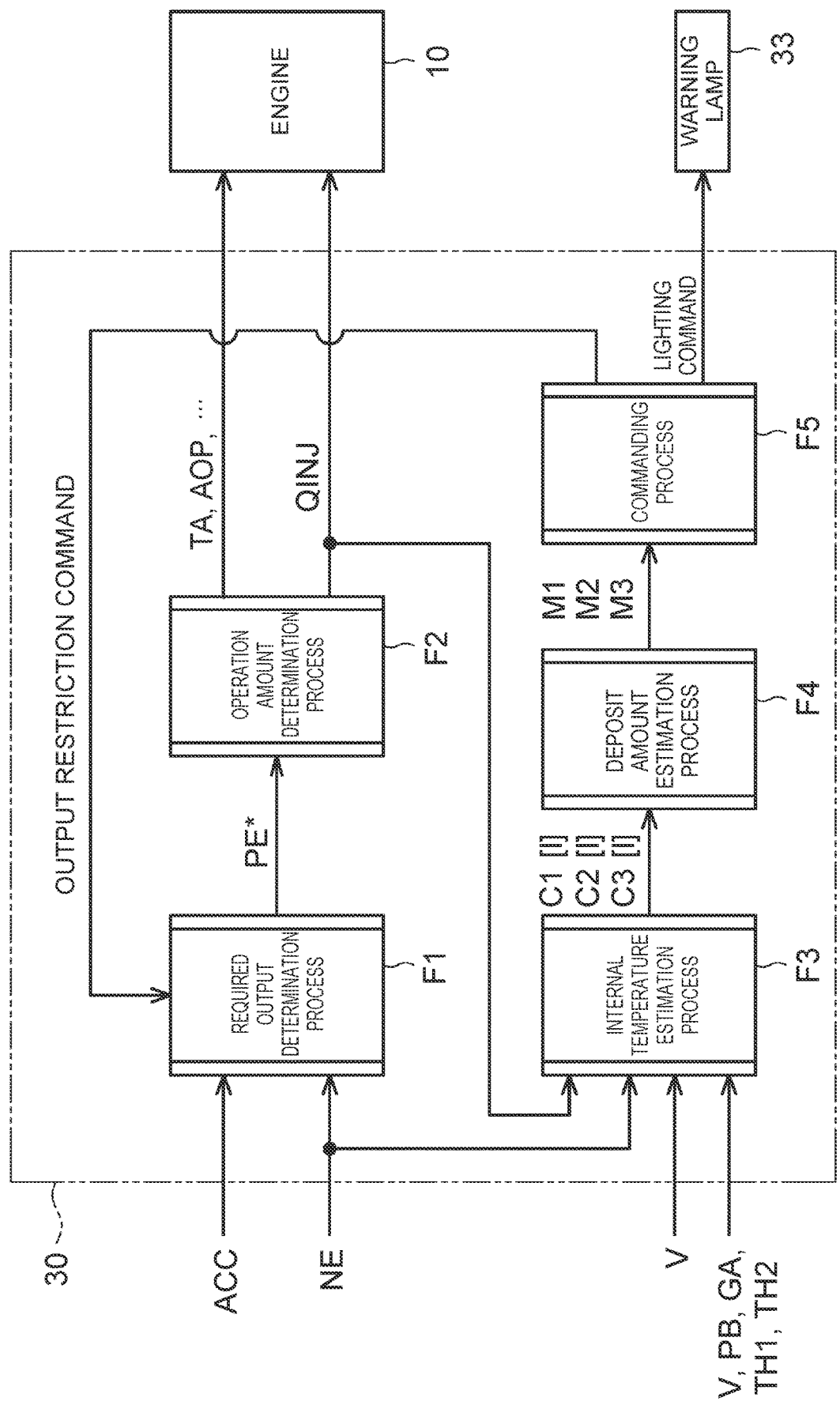
FIG. 2 is a block diagram showing relationships among processes involved in estimation of the amount of oil coke deposits in the estimation device performed in the estimation device.

FIG. 2 shows an overview of processes executed by the electronic control unit 30. Each of the processes shown in FIG. 2 is a process that is implemented as the arithmetic processing circuit 31 reads and executes a program stored in the memory 32.

The arithmetic processing circuit 31 performs a required output determination process F1 of determining a required output PE* that is a required value of an engine output, and an operation amount determination process F2 of determining an engine operation amount based on the required output PE*. In the required output determination process F1, the value of the required output PE* is determined based on the engine speed NE, the accelerator pedal operation amount ACC, etc. In the operation amount determination process F2, the engine operation amounts, including a throttle opening TA, a fuel injection amount QINJ, and an ignition timing AOP, are determined based on the required output PE*, the engine speed NE, etc. In the operation amount determination process F2, the value of each engine operation amount is determined such that an engine output corresponding to the value of the required output PE* can be produced at the current engine speed NE.

Meanwhile, the arithmetic processing circuit 31 performs an internal temperature estimation process F3 of estimating the internal temperature of the turbocharger 20, and a deposit amount estimation process F4 of estimating an amount of oil coke deposited inside the turbocharger 20. In the internal temperature estimation process F3, an estimated value of the internal temperature of the turbocharger 20 is calculated based on the travel state quantities of the vehicle. In the deposit amount estimation process F4, an estimated value of the amount of oil coke deposits is calculated based on the estimated value of the internal temperature obtained in the internal temperature estimation process F3. Further, the arithmetic processing circuit 31 executes a commanding process F5 of commanding that a warning lamp 33 be lit and that the engine output be restricted based on the estimated value of the amount of oil coke deposits. In this embodiment, the arithmetic processing circuit 31 that executes these internal temperature estimation process F3, deposit amount estimation process F4, and commanding process F5 corresponds to the execution device.

In this embodiment, in the internal temperature estimation process F3, wall surface temperatures at three portions of the oil passage 28 are each estimated as the internal temperature of the turbocharger 20. In the deposit amount estimation process F4, the amount of oil coke deposited at each of the three portions is estimated. These three portions are portions P1, P2, and P3 shown in FIG. 1. These portions P1, P2, and P3 are portions of the oil passage 28 provided inside the turbocharger 20 where the wall surface temperature tends to become high as well as deposition of oil coke tends to lead to problems.

Configuration of Neural Network

In the internal temperature estimation process F3, the arithmetic processing circuit 31 calculates estimated temperatures t1, t2, and t3 that are estimated values of the wall surface temperatures at the portions P1, P2, and P3, respectively, using a neural network 34 stored in the memory 32. The configuration of the neural network 34 will be described with reference to FIG. 3.

The neural network 34 includes an input layer having N nodes, an intermediate layer having M nodes, and an output layer having three nodes. Symbol "i" in the following description represents an arbitrary integer not smaller than one and not larger than N. Symbol "j" in the following description represents an arbitrary integer not smaller than one and not larger than M.

Figure 3:
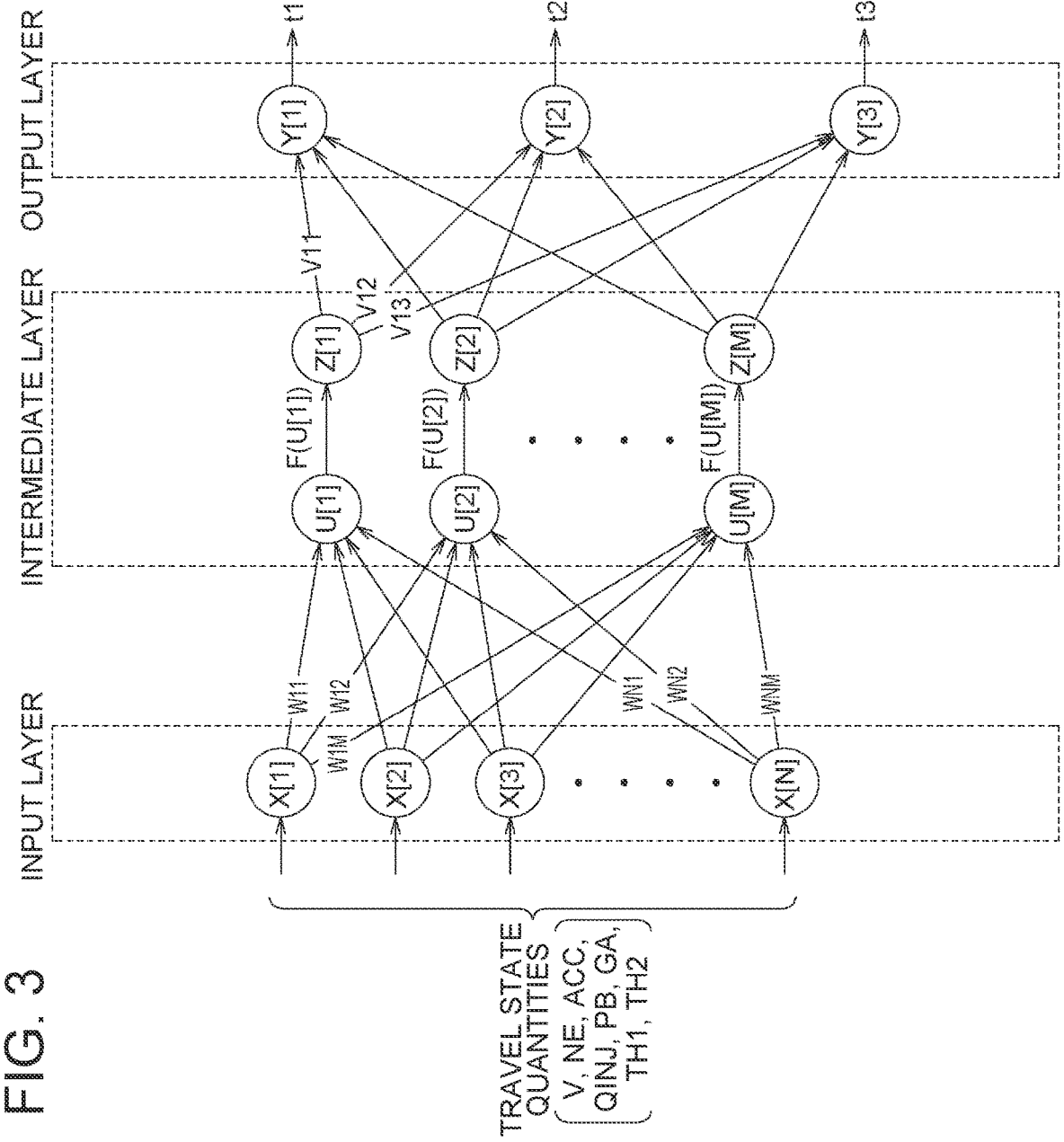
FIG. 3 is a diagram schematically showing the configuration of a neural network used to estimate the amount of oil coke deposits in the estimation device.

In FIG. 3, input values of the respective nodes in the input layer are denoted by X[1], X[2], ..., X[N]. The input values X[1] to X[N] of the respective nodes are travel state quantities that are state quantities indicating a travel state of the vehicle. As the travel state quantities constituting the input values X[1] to X[N], time-series data of each of the vehicle speed V, the engine speed NE, the accelerator pedal operation amount ACC, the fuel injection amount QINJ, the supercharging pressure PB, and the intake air flow rate GA, and instantaneous value data of the outside air temperature TH1 and the intake air temperature TH2 are used. The time-series data here refers to a sequence of values arrayed in chronological order that are a predetermined number of the latest values among measured values of each travel state quantity acquired on a predetermined sampling cycle.

In FIG. 3, input values of the respective nodes in the intermediate layer are denoted by U[1], U[2], ..., U[M], and output values of the respective nodes in the intermediate layer are denoted by Z[1], Z[2], ..., Z[M]. The input value U[j] of each node in the intermediate layer is calculated as a sum of values that are the input values X[1], X[2], ..., X[N] of the input layer each multiplied by a weight Wij. The output values Z[1], Z[2], ..., Z[M] of the respective nodes in the intermediate layer are each calculated as a return value of an activating function F having the input value U[j] of that node as a parameter. In this embodiment, a sigmoid function is used as the activating function F.

In FIG. 3, input values of the three nodes in the output layer are denoted by Y[1], Y[2], and Y[3]. As Y[1], a sum of values that are the output values Z[j] of the respective nodes in the intermediate layer each multiplied by a weight Vj1 is input. As Y[2], a sum of values that are the output values Z[j] of the respective nodes in the intermediate layer each multiplied by a weight Vj2 is input. As Y[3], a sum of values that are the output values Z[j] of the respective nodes in the intermediate layer each multiplied by a weight Vj3 is input. In this neural network 34, the input values Y[1], Y[2], and Y[3] of the respective nodes in the output layer are directly used as output values of these nodes. Symbols Y[1], Y[2], and Y[3] represent the estimated temperature t1 at the portion P1, the estimated temperature t2 at the portion P2, and the estimated temperature t3 at the portion P3, respectively.

Learning of Neural Network

Next, a method of generating such a neural network 34, i.e., learning of the neural network 34 will be described. Learning of the neural network 34 is performed using a computer for learning.

To learn the neural network 34, teacher data is created using a vehicle for learning in which temperature sensors are installed at the portions P1 to P3 of the turbocharger 20. To create the teacher data, the travel state quantities used as an input for the neural network 34 and the temperatures at the portions P1 to P3 are measured in the vehicle for learning. This measurement is performed in various travel states, and a large number of data sets each combining measured values of the temperatures at the portions P1 to P3 and measured values of the travel state quantities measured at the time of measurement of those temperatures are created.

Learning of the neural network 34 is performed using the teacher data composed of a large number of data sets thus created. Specifically, first, the measured values of the travel state quantities in the data set are input into the input layer of the neural network 34 as the values of X[1] to X[N]. Then, the values of the weights Wij, Vj1, Vj2, and Vj3 are corrected using an error back propagation method such that errors between the values of Y[1] to Y[3] output by the neural network 34 in response to that input and the measured values of the temperatures at the portions P1 to P3 become smaller. This process of correcting the weights Wij, Vj1, Vj2, and Vj3 is repeated until the errors become equal to or smaller than a predefined value. When the errors become equal to or smaller than the predefined value, it is determined that learning of the neural network 34 has been completed. The memory 32 of the electronic control unit 30 of each vehicle stores the neural network 34 thus learned, i.e., a learned network.

Internal Temperature Estimation Process

Next, the details of the internal temperature estimation process F3 will be described with reference to FIG. 4. In the internal temperature estimation process F3, the estimated temperatures t1 to t3 at the respective portions P1 to P3 are calculated using the neural network 34.

Figure 4:
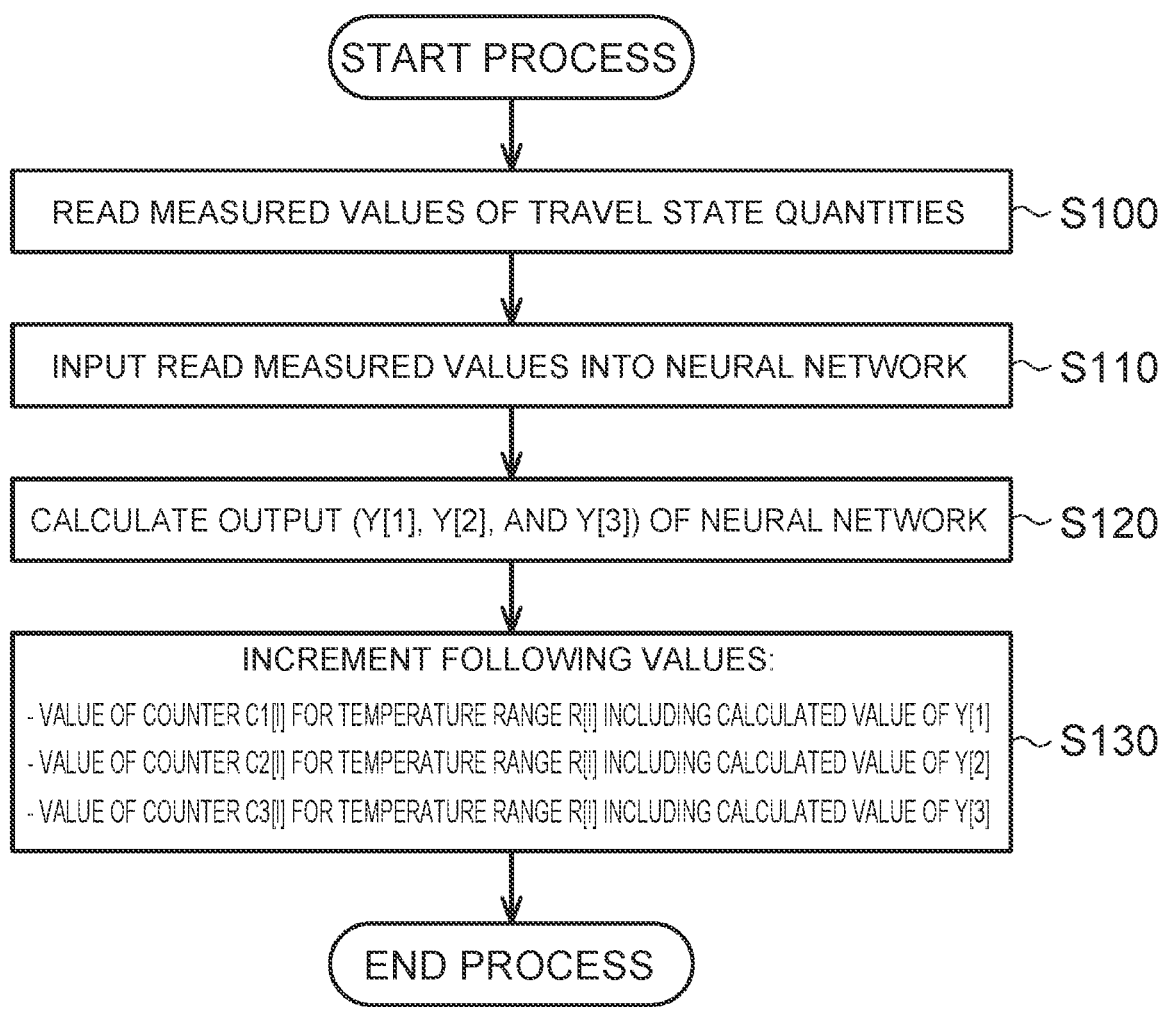
FIG. 4 is a flowchart of an internal temperature estimation process executed by the estimation device.

FIG. 4 shows a flowchart of a processing routine involved in the internal temperature estimation process F3. The process of this routine is repeatedly executed by the arithmetic processing circuit 31 on a cycle of a predetermined time T while the engine 10 is in operation.

When the process of this routine is started, first, in step S100, measured values of the travel state quantities to be input into the neural network 34 are read. Specifically, measured values of time-series data of the vehicle speed V, the engine speed NE, the accelerator pedal operation amount ACC, the fuel injection amount QINJ, the supercharging pressure PB, and the intake air flow rate GA, and measured values of instantaneous value data of the outside air temperature TH1 and the intake air temperature TH2 are read.

Next, in step S110, the measured values of the travel state quantities read in step S100 are set as the values of the input values X[1] to X[N] of the respective nodes in the input layer of the neural network 34. In the next step S120, values of Y[1] to Y[3] that are the output of the neural network 34 are calculated. The values of Y[1], Y[2], and Y[3] calculated here respectively represent the estimated temperatures t1, t2, and t3 at the portions P1 to P3 at the time of measurement of the travel state quantities having been input into the neural network 34.

In this embodiment, a range of values that the wall surface temperature of the oil passage 28 at the portions P1 to P3 can assume during operation of the engine 10 is divided into a plurality of temperature ranges. In the following description, these temperature ranges will be denoted by R[1], R[2], ..., R[L] in order of increasing temperature. Symbol "L" here represents the number of temperature ranges. Further, in this embodiment, for each of the portions P1 to P3, counters indicating the number of times of calculation of the estimated temperature for the respective temperature ranges R[1] to R[L] are set. In the following description, counters indicating the number of times of calculation of the estimated temperature t1 in the respective temperature ranges R[1], R[2], ..., R[L] for the portion P1 will be referred to as counters C1[1], C1[2], ..., C1[L]. Similarly, counters indicating the number of times of calculation of the estimated temperature t2 in the respective temperature ranges R[1], R[2], ..., R[L] for the portion P2 will be referred to as counters C2[1], C2[2], ..., C2[L]. Further, counters indicating the number of times of calculation of the estimated temperature t3 in the respective temperature ranges R[1], R[2], ..., R[L] for the portion P3 will be referred to as counters C3[1], C3[2], ..., C3[L].

In step S130, the following values are incremented. In step S130, the value of the counter C1[1] for the temperature range R[1] including a calculated value of the estimated temperature t1 is incremented. Further, in step S130, each of the value of the counter C2[1] for the temperature range R[1] including a calculated value of the estimated temperature t2, and the value of the counter C3[1] for the temperature range R[1] including a calculated value of the estimated temperature t3 is incremented. Thereafter, the process of this routine in the current period is ended.

Deposit Amount Estimation Process and Commanding Process

Figure 5:
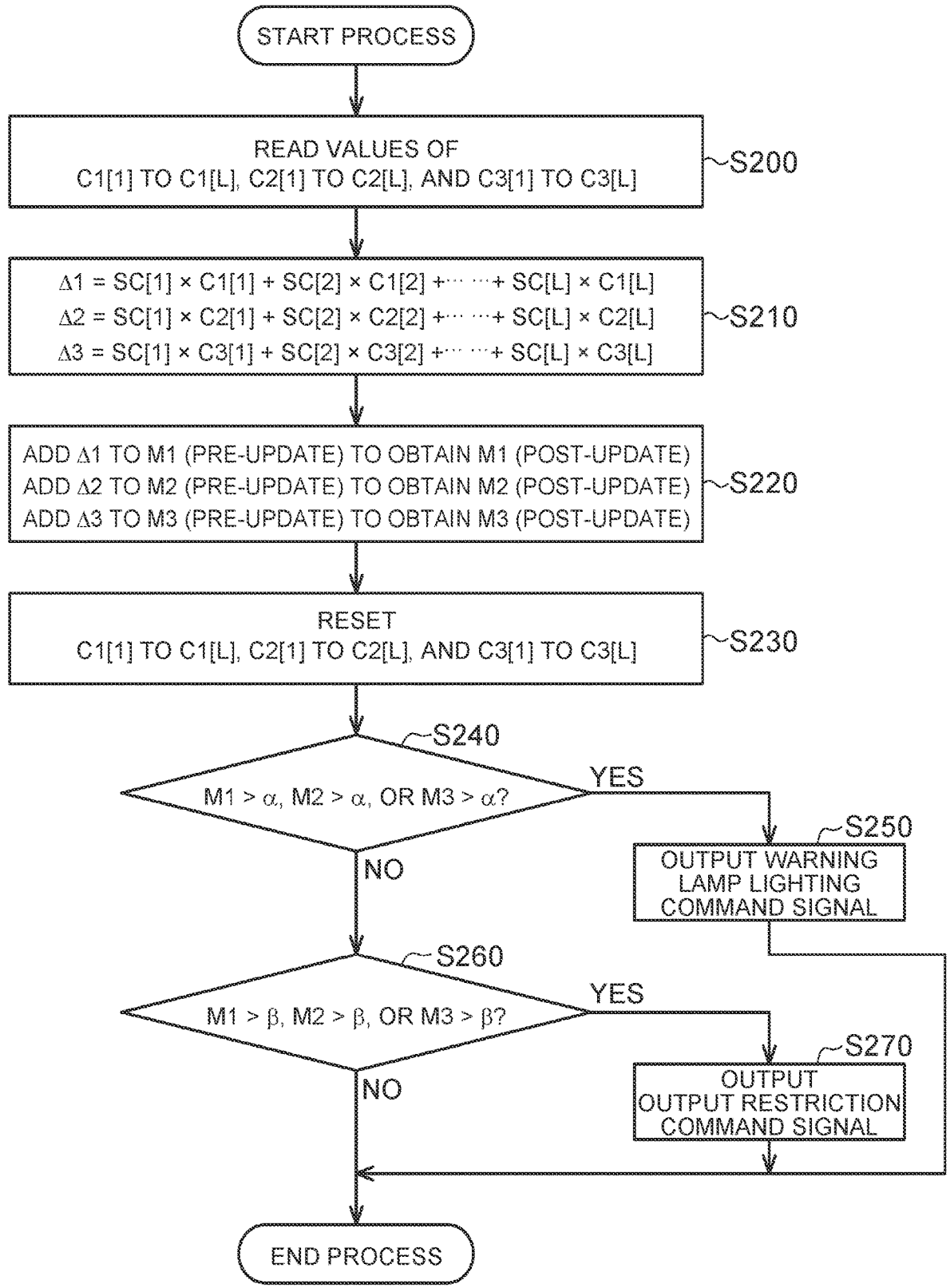
FIG. 5 is a flowchart of a deposit amount estimation process and a commanding process executed by the estimation device.

Next, the details of the deposit amount estimation process F4 and the commanding process F5 will be described with reference to FIG. 5 and FIG. 6. FIG. 5 is a flowchart of a processing routine involved in the deposit amount estimation process F4 and the commanding process F5. The series of processes shown in FIG. 5 are executed by the arithmetic processing circuit 31 each time the vehicle travels a predetermined distance D.

When the process of this routine is started, first, in step S200, the values of the counters C1[1] to C1[L], C2[1] to C2[L], and C3[1] to C3[L] are read. Next, in step S210, the values of amounts of increase Δ1 to Δ3 in the amounts of oil coke deposited at the respective portions P1 to P3 during a period from the last execution to the current execution of this routine are calculated. The amounts of increase Δ1 to Δ3 are calculated as values that meet the relationships of Expressions (1) to (3), respectively. Symbols SC[1] to SC[L] in Expressions (1) to (3) represent coking rates set for the respective temperature ranges. The value of the coking rate SC[1] represents an amount of oil coke that is deposited on the wall surface of the oil passage 28 when a state where the wall surface temperature of the oil passage 28 has become a temperature within the corresponding temperature range R[1] is maintained for the predetermined time T.

[Expression 1]

$$\Delta 1 = SC[1] \times C1[1] + SC[2] \times C1[2] + \ldots + SC[L] \times C1[L] \quad (1)$$

$$\Delta 2 = SC[1] \times C2[1] + SC[2] \times C2[2] + \ldots + SC[L] \times C2[L] \quad (2)$$

$$\Delta 3 = SC[1] \times C3[1] + SC[2] \times C3[2] + \ldots + SC[L] \times C3[L] \quad (3)$$

Figure 6:
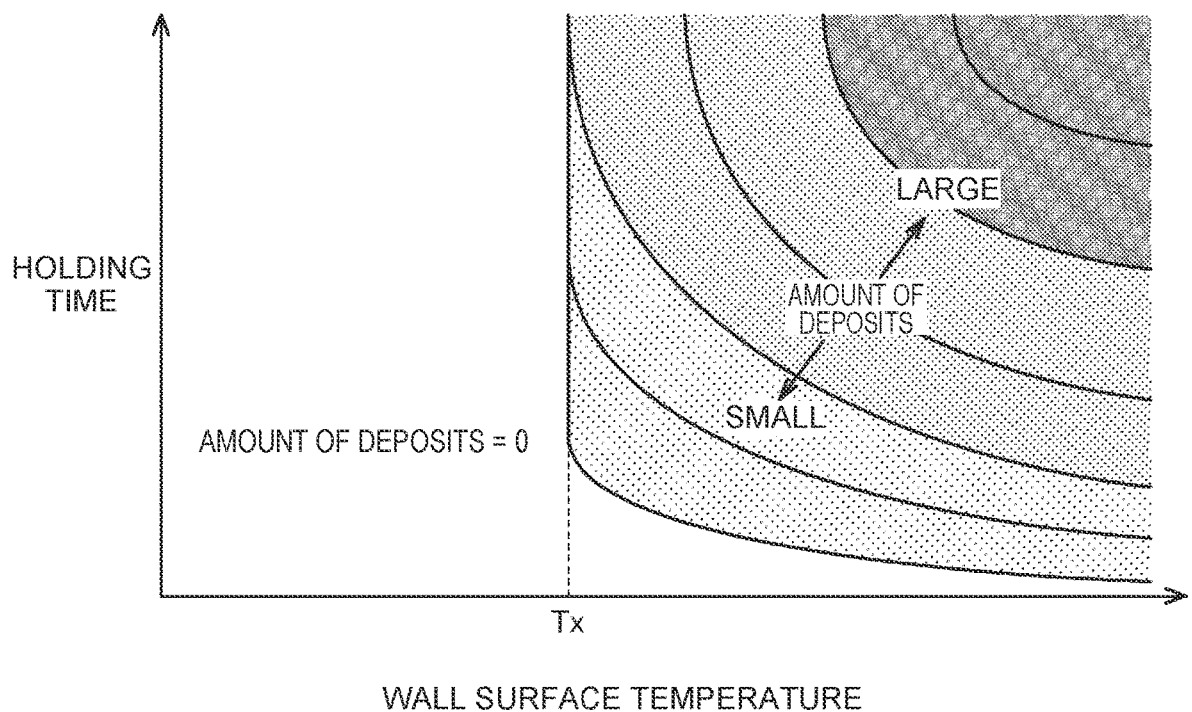
FIG. 6 is a graph showing relationships among a wall surface temperature of an oil passage of the turbocharger, a holding time of the wall surface temperature, and the amount of oil coke deposits.

FIG. 6 shows relationships among the temperature of the wall surface of the oil passage 28, a holding time of the temperature, and the amount of oil coke deposited on the wall surface of the oil passage 28 when the wall surface of the oil passage 28 is kept at a constant temperature. Oil coke is generated when oil is heated beyond a certain temperature. In the following description, a temperature at a lower limit of a range of the oil temperature in which oil coke is generated will be referred to as a coking start temperature Tx. When the wall surface temperature is in a range lower than the coking start temperature Tx, the amount of oil coke deposits is zero regardless of the holding time. On the other hand, in a range of the wall surface temperature not lower than the coking start temperature Tx, the ratio of the amount of deposits to the holding time, i.e., the coking rate increases as the wall surface temperature rises. The value of the coking rate SC[1] in each temperature range R[1] is set based on these relationships. Thus, in temperature ranges on the lower temperature side from the coking start temperature Tx, zero is set as the value of the coking rate. In temperature ranges on the higher temperature side from the coking start temperature Tx, a larger value is set as the value of the coking rate for a temperature range farther on the high temperature side.

In the next step S220, the values of estimated amounts of coke deposits M1 to M3 that are estimated values of the amounts of oil coke deposited at the portions P1 to P3, respectively, are updated based on the amounts of increase Δ1 to Δ3 calculated in step S210. Here, the estimated amounts of coke deposits M1 to M3 are each updated such that a sum of a pre-update value and a corresponding one of the amounts of increase Δ1 to Δ3 added thereto constitutes a post-update value.

In the internal temperature estimation process F3, it is assumed that values accurately reflecting the wall surface temperatures at the portions P1 to P3 are calculated as the values of the estimated temperatures t1 to t3. It is also assumed that the wall surface temperatures at the portions P1 to P3 are held constant during a period from when the estimated temperatures t1 to t3 are calculated by the processing routine of FIG. 4 until this processing routine is executed next time. In this case, the amount of oil coke deposited at the portion P1 during this period increases by an amount corresponding to the value of the coking rate SC[1] in the temperature range R[1] including the value of the estimated temperature t1. Similarly, the amount of oil coke deposited at the portion P2 increases by an amount corresponding to the value of the coking rate SC[1] in the temperature range R[1] including the value of the estimated temperature t2. Further, the amount of oil coke deposited at the portion P3 increases by an amount corresponding to the value of the coking rate SC[1] in the temperature range R[1] including the value of the estimated temperature t3.

The amount of increase Δ1 is obtained, for each of values of the estimated temperature t1 calculated during a period in which the vehicle travels the predetermined distance D, as a value integrating the coking rate SC[1] in the temperature range R[1] including the calculated value of that estimated temperature t1. The amounts of increase Δ2 and Δ3 are obtained in the same manner. Values each integrating the corresponding one of the amounts of increase Δ1 to Δ3 obtained each time the vehicle travels the predetermined distance D are calculated as the values of the estimated amounts of coke deposits M1 to M3. In this way, in this embodiment, the estimated amounts of coke deposits M1 to M3 that are estimated values of the amounts of oil coke deposited at the portions P1 to P3, respectively, are calculated as values integrating the amounts by which the amounts of oil coke deposited at the portions P1 to P3 increase during each predetermined time T and which are obtained from the calculated values of the estimated temperatures t1 to t3. Thus, the estimated amounts of coke deposits M1 to M3 in this embodiment are essentially calculated by calculating the amounts of increase in the amounts of oil coke deposits based on the calculated values of the estimated temperatures t1 to t3 and then integrating these amounts of increase.

When the estimated amounts of coke deposits M1 to M3 are thus calculated, the process moves to step S230. In step S230, the values of the counters C1[1] to C1[L], C2[1] to C2[L], and C3[1] to C3[L] are reset to zero, and then the process moves to step S240.

When the process moves to step S240, it is determined in step S240 whether one or more of the estimated amounts of coke deposits M1 to M3 at the respective portions P1 to P3 are equal to or larger than a predetermined waning threshold value α. When the determination result is affirmative (YES), the process moves to step S250. In step S250, a command signal commanding that the warning lamp 33 be lit is output, and then the current processing of the routine is ended.

Meanwhile, when the determination result is negative (NO) in step S240, the process moves to step S260.

When the process moves to step S260, it is determined in step S260 whether one or more of the estimated amounts of coke deposits M1 to M3 at the respective portions P1 to P3 are equal to or larger than a predetermined output restriction threshold value β. A value smaller than the waning threshold value α is set as the output restriction threshold value β. When the determination result is affirmative (YES) in step S260, the process moves to step S270. In step S270, a command signal commanding that the engine output be restricted is output, and then the current processing of the routine is ended. Meanwhile, when the determination result is negative (NO) in step S260, the current processing of the routine is directly ended.

The values of the estimated amounts of coke deposits M1 to M3 are stored and retained in the memory 32 also when the electronic control unit 30 is not operating. When oil coke deposited inside the turbocharger 20 is removed or the turbocharger 20 is replaced with a new one by maintenance, the values of the estimated amounts of coke deposits M1 to M3 stored in the memory 32 are each reset to zero.

In determining the required output PE* in the required output determination process F1, the electronic control unit 30 sets a maximum value in a setting range of the value of the required output PE* to a smaller value when a command signal for restricting the output is being output than when the command signal is not being output. In this embodiment, the output of the engine 10 is thus restricted.

In this embodiment, the processes from step S200 to step S230 of FIG. 5 are processes corresponding to the deposit amount estimation process F4. The processes from step S240 to step S270 of FIG. 5 are processes corresponding to the commanding process F5.

Workings and Effects of Embodiment

The workings and effects of the embodiment will be described.

The amounts of oil coke deposited at the portions P1 to P3 of the oil passage 28 provided inside the turbocharger 20 depend on the wall surface temperatures at the portions P1 to P3. The wall surface temperatures at the portions P1 to P3 change with the travel state of the vehicle. There are a large number of travel state quantities that influence the wall surface temperature, and the relationship between each travel state quantity and the internal temperature is complicated. In view of this, in the embodiment, the relationships between the travel state quantities and the wall surface temperatures at the portions P1 to P3 are leaned in the form of the neural network 34 through machine learning. By using this neural network 34, the estimated temperatures t1 to t3 that are estimated values of the wall surface temperatures at the portions P1 to P3, respectively, are calculated from the measured values of the travel state quantities. Thus, the estimated temperatures t1 to t3 are calculated as values accurately reflecting the wall surface temperatures at the portions P1 to P3.

Further, from the calculated values of the estimated temperatures t1 to t3, the amounts of increase in the amounts of oil coke deposited at the portions P1 to P3 during the predetermined time T are obtained. In the embodiment, the estimated amounts of coke deposits M1 to M3 that are estimated values of the amounts of oil coke deposited at the respective portions P1 to P3 are calculated as values integrating the amounts of increase in the amounts of oil coke deposits obtained from the calculated values of the estimated temperatures t1 to t3. Thus, the values of the estimated amounts of coke deposits M1 to M3 are calculated as values accurately reflecting the actual amounts of oil coke deposited at the respective portions P1 to P3.

The estimation device of an amount of oil coke deposits in a turbocharger of the above embodiment can produce the following effects:

(1) In the embodiment, the relationships between the travel state quantities and the wall surface temperatures at the portions P1 to P3 are leaned in the form of the neural network 34. In the internal temperature estimation process F3, by using this neural network 34, the estimated temperatures t1 to t3 that are estimated values of the wall surface temperatures at the portions P1 to P3 are calculated from the measured values of the travel state quantities. Further, in the embodiment, in the deposit amount estimation process F4, values integrating the amounts of increase obtained from the calculation result of the estimated temperatures t1 to t3 are calculated as the values of the estimated amounts of coke deposits M1 to M3 that are estimated values of the amounts of oil coke deposited at the portions P1 to P3, respectively. Thus, the amounts of oil coke deposited inside the turbocharger 20 can be accurately estimated.

(2) In the embodiment, when one of the estimated amounts of coke deposits M1 to M3 becomes equal to or larger than the output restriction threshold value β, a command signal commanding that the output of the engine 10 be restricted is output. When the output of the engine 10 becomes high, the temperature of exhaust gas flowing into the turbine wheel 24 of the turbocharger 20 becomes high and the wall surface temperatures at the portions P1 to P3 also become high. Deposition of oil coke on the wall surface of the oil passage 28 is further promoted when the wall surface temperature is higher. Therefore, restricting the output of the engine 10 can mitigate the rise in the wall surface temperature and thereby reduce the likelihood of further deposition of oil coke. In reality, however, placing a restriction on the output of the engine 10 in a state where deposition of oil coke has not progressed so much as to necessitate a restriction on the output would inconvenience the user of the vehicle. In this regard, the amounts of oil coke deposited at the portions P1 to P3 can be accurately estimated in the embodiment. Therefore, a restriction on the output of the engine 10 for reducing the likelihood of deposition of oil coke can be placed at an appropriate time.

(3) In the embodiment, when one of the estimated amounts of coke deposits M1 to M3 becomes equal to or larger than the warning threshold value α, a command signal commanding that the warning lamp 33 be lit is output. Through lighting of the warning lamp 33, the user of the vehicle is notified that the turbocharger 20 needs maintenance. In reality, giving this notification in a state where deposition of oil coke has not progressed so much as to necessitate maintenance would inconvenience the user of the vehicle. In this regard, the amounts of oil coke deposited at the portions P1 to P3 can be accurately estimated in the embodiment. Therefore, this notification can be given at an appropriate time when deposition of oil coke has progressed to such an amount as to necessitate maintenance of the turbocharger 20.

(4) The internal temperature of the turbocharger 20 is determined by a heat balance between an amount of heat that the turbocharger 20 receives from exhaust gas flowing inside the turbine housing 21 and an amount of heat that a travel wind hitting the turbocharger 20 takes away from the turbocharger 20. Of these amounts of heat, the amount of heat that the turbocharger 20 receives from the exhaust gas is determined by the temperature and the flow rate of the exhaust gas. Major travel state quantities linked to the temperature and the flow rate of the exhaust gas include the engine speed NE, the accelerator pedal operation amount ACC, the fuel injection amount QINJ, the supercharging pressure PB, the intake air flow rate GA, and the intake air temperature TH2. Meanwhile, the amount of heat that the travel wind takes away from the turbocharger 20 is determined by the flow rate and the temperature of the travel wind hitting the turbocharger 20. The flow rate of the travel wind hitting the turbocharger 20 becomes higher as the vehicle speed V becomes higher. The temperature of the travel wind hitting the turbocharger 20 is the outside air temperature TH1. Thus, the vehicle speed V, the engine speed NE, the accelerator pedal operation amount ACC, the fuel injection amount QINJ, the supercharging pressure PB, the intake air flow rate GA, the outside air temperature TH1, and the intake air temperature TH2 are travel state quantities of a vehicle that have significant influences on the internal temperature of the turbocharger 20. In the embodiment, the vehicle speed V, the engine speed NE, the accelerator pedal operation amount ACC, the fuel injection amount QINJ, the supercharging pressure PB, the intake air flow rate GA, the outside air temperature TH1, and the intake air temperature TH2 that are highly related to the internal temperature are used as the travel state quantities of the vehicle to be input into the neural network 34. Therefore, the neural network 34 can be configured as a model capable of precisely estimating the internal temperature of the turbocharger 20.

(5) It takes some time before changes in the travel state quantities of the vehicle are reflected on the internal temperature of the turbocharger 20. Of the above-described travel state quantities to be input into the neural network 34, the vehicle speed V, the engine speed NE, the accelerator pedal operation amount ACC, the fuel injection amount QINJ, the supercharging pressure PB, and the intake air flow rate GA are travel state quantities that change greatly while the vehicle travels. In the embodiment, for the vehicle speed V, the engine speed NE, the accelerator pedal operation amount ACC, the fuel injection amount QINJ, the supercharging pressure PB, and the intake air flow rate GA, time-series data of each of these quantities is used as the input for the neural network 34. Thus, the internal temperature of the turbocharger 20 can be estimated as a value reflecting a delay with which changes in the travel state quantities are reflected on the internal temperature.

(6) The outside air temperature TH1 and the intake air temperature TH2 do not change greatly over a short time. Therefore, when time-series data of each of the outside air temperature TH1 and the intake air temperature TH2 is obtained, values in that time-series data are almost the same values. For this reason, using a single measured value, instead of time-series data, of each of the outside air temperature TH1 and the intake air temperature TH2 as the input for the neural network 34 has little influence on the estimation result of the internal temperature. On the other hand, when the number of values input into the neural network 34 increases, the structure of the neural network 34 becomes complicated accordingly, so that it takes a longer time to learn and to calculate the estimated temperatures t1 to t3. In the embodiment, for each of the outside air temperature TH1 and the intake air temperature TH2, a single measured value, instead of time-series data, is used as the input for the neural network 34 to thereby avoid unnecessarily complicating the structure of the neural network 34.

The embodiment can be implemented with the following changes made thereto. The embodiment and the following modified examples can be implemented in combinations within such a range that no technical inconsistency arises.

In the above embodiment, time-series data of the vehicle speed V, the engine speed NE, the accelerator pedal operation amount ACC, the fuel injection amount QINJ, the supercharging pressure PB, and the intake air flow rate GA is input into the neural network 34, but a single measured value of each of these quantities may instead be input.

In the above embodiment, the vehicle speed V, the engine speed NE, the accelerator pedal operation amount ACC, the fuel injection amount QINJ, the supercharging pressure PB, the intake air flow rate GA, the outside air temperature TH1, and the intake air temperature TH2 are used as the travel state quantities of the vehicle to be input into the neural network 34. One or more of these travel state quantities may be omitted from the input for the neural network 34, or travel state quantities of the vehicle other than these quantities may be added to the input for the neural network 34.

In the above embodiment, the values of the estimated amounts of coke deposits M1 to M3 are updated each time the vehicle travels the predetermined distance D. The values of the estimated amounts of coke deposits M1 to M3 may be updated on other cycle than this. For example, the values of the estimated amounts of coke deposits M1 to M3 may be updated each time the estimated temperatures t1 to t3 are calculated. In this case, the estimated amounts of coke deposits M1 to M3 are each updated such that a sum of a pre-update value and the value of the coking rate SC[1] in the temperature range R[1] including the corresponding one of the estimated temperatures t1 to t3 added thereto constitutes a post-update value.

The user may be notified that the turbocharger 20 needs maintenance by a method other than lighting the warning lamp 33. For example, a command signal for notification may be sent from the vehicle to the user's mobile terminal through a wide area communication network and the notification may be given by the mobile terminal.

When oil deteriorates, it becomes prone to coking. Therefore, the degree of deterioration of oil may be estimated from a distance that the vehicle has traveled since an oil change etc., and this estimation result may be reflected on the calculation result of the estimated amounts of coke deposits M1 to M3. For example, based on the degree of deterioration of oil, the values of the coking rates SC[1] to SC[L] in the respective temperature ranges R[1] to R[L] may be calculated as values that become larger as the degree of deterioration of oil becomes higher.

In the above embodiment, the wall surface temperatures at the three portions P1 to P3 of the oil passage 28 are estimated as the internal temperature of the turbocharger 20, and the amounts of oil coke deposited at the portions P1 to P3 are estimated from these estimated values. The positions and number of the portions at which the internal temperature of the turbocharger 20 and the amount of oil coke deposits are estimated may be changed as necessary.

The upper limit value of the amount of oil coke deposits that is allowable inside the turbocharger 20 may vary among portions of the turbocharger 20. In such cases, different values of the waning threshold value α and the output restriction threshold value β should be set for different portions.

In the above embodiment, the electronic control unit 30 installed in the vehicle performs estimation of the internal temperature and the amount of coke deposits. This estimation may be performed at a data center outside the vehicle. In this case, measured values of travel state quantities are sent from the vehicle to the data center, and estimation of the internal temperature and the amount of oil coke deposits based on the sent measured values is performed at the data center. Then, the estimation result of the amount of oil coke deposits or a command signal based on the estimation result is sent from the data center to the vehicle.

In the above embodiment, the neural network 34 having only one intermediate layer is used, but the neural network 34 may be configured to have a plurality of intermediate layers.

What is claimed is:

1. A vehicle control device comprising:
an electronic control unit (ECU); and
a storage device, wherein:
the storage device stores
   a neural network into which travel state quantities indicating a travel state of a vehicle are input and from which an internal temperature of a turbocharger installed in an engine of the vehicle is output, the neural network being learned using, as teacher data, a measured value of the internal temperature and measured values of the travel state quantities measured at a time of measurement of the internal temperature, and
   a relationship map showing a relationship between a holding time and a temperature, and an amount of oil coke deposited inside the turbocharger when the internal temperature is kept at the temperature for the holding time,
the ECU is configured to repeatedly execute an estimation process, a required-output determination process, and an operation amount determination process,
the estimation process includes
   an internal temperature estimation process of calculating, as an estimated value of the internal temperature, an output of the neural network using the measured values of the travel state quantities as an input, and
   a deposit amount estimation process of
      calculating, by referring the relationship map, an amount of increase in an amount of oil coke deposits inside the turbocharger based on the estimated value of the internal temperature and a time period from last execution of the deposit amount estimation process to current execution of the deposit amount estimation process, and
      calculating an estimated value of the amount of oil coke deposits as a value integrating the amount of increase, and
      comparing the estimated value of the amount of oil coke deposits and a predetermined threshold value,
the required-output determination process includes
   determining a required output that is an output value required for the engine, and
   setting a smaller value, as a maximum value of a setting range of the required output, when the estimated value of the amount of oil coke deposits is larger than the predetermined threshold value than when the estimated value is equal to or smaller than the predetermined threshold value, and
the operation amount determination process includes
   determining an operation amount of the engine based on which the engine produces an output corresponding to the required output, and
   controlling the engine based on the operation amount.

2. The vehicle control device according to claim 1, wherein, when the estimated value of the amount of oil coke deposits is larger than the predetermined threshold value, the ECU is configured to execute a commanding process of commanding that a user of the vehicle be notified that the turbocharger is in a state requiring maintenance.

3. The vehicle control device according to claim 1, wherein time-series data of the travel state quantities is used as an input into the neural network.

4. The vehicle control device according to claim 1, wherein the travel state quantities include one or more of a vehicle speed, an engine speed, an accelerator pedal operation amount, a fuel injection amount, a supercharging pressure, an intake air flow rate, an outside air temperature, and an intake air temperature.

5. The vehicle control device according to claim 1, wherein the ECU is configured to
   calculate, by executing the estimation process, a plurality of the estimated values of the amount of oil coke deposits for multiple portions of an oil passage inside the turbocharger, respectively, and
   set, in the required-output determination process, the smaller value when at least one of the estimated values is greater than the predetermined threshold value.

* * * * *